Figure 1:
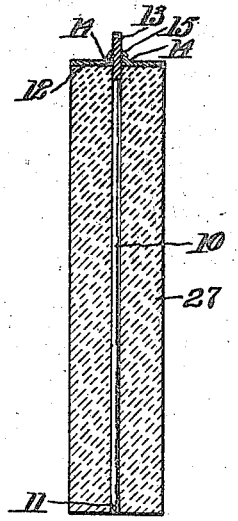

J. A. JEFFERY.
DEVICE FOR HANDLING ARTICLES OF CERAMIC MATERIAL.
APPLICATION FILED APR. 19, 1913.

1,248,334. Patented Nov. 27, 1917.

WITNESSES
C. H. Walker
M. E. Smith.

INVENTOR
Joseph A. Jeffery
By Hodges & Hodges
Attorneys.

UNITED STATES PATENT OFFICE.

JOSEPH A. JEFFERY, OF DETROIT, MICHIGAN.

DEVICE FOR HANDLING ARTICLES OF CERAMIC MATERIAL.

1,248,334.

Specification of Letters Patent.

Patented Nov. 27, 1917.

Application filed April 19, 1913. Serial No. 762,415.

*To all whom it may concern:*

Be it known that I, JOSEPH A. JEFFERY, a citizen of the United States, residing at Detroit, in the county of Wayne and State of Michigan, have invented new and useful Improvements in Devices for Handling Articles of Ceramic Material, of which the following is a specification.

This invention relates to certain new and useful improvements in devices for handling articles of ceramic material while said articles remain in a plastic condition.

In the manufacture of small porcelain articles, such as insulating plugs for spark plugs, and the like, the common practice is to place a mass of the plastic clay upon a rapidly revolving table, and then the operator roughly shapes the material by hand to the desired form, after which the clay is allowed to stand a predetermined period, or until it reaches the condition known as "green" or half-hard. This method of shaping the blank is known as "throwing." While the blank is still "green" it is brought to the desired finished shape by being placed in a turning lathe, the proper contour being imparted by means of tools held in the hands of the operator, or otherwise positioned over the clay. After the blank has been brought to the desired shape it is dried and dipped into a suitable glaze and fired. In order to form the blanks by "throwing" the clay must be in a rather soft plastic condition, and it is obvious that by reason of this fact the blank, when formed, must be very carefully handled to prevent distortion and collapse while being placed upon the drying trays, and in the other handling incident to the several stages of manufacture. Furthermore, in the case of such articles as may require a longitudinal bore, it is very common for a large percentage of the blanks to become useless by reason of the collapse of the bore while the material is still plastic. One of the objects of the present invention is to provide a simple and inexpensive device for handling the plastic blanks from the time they are first shaped and in a plastic condition, until they have hardened sufficiently to stand future handling without injury. A further object is to provide a device that will serve to maintain the alinement of the plastic blank until the same has hardened sufficiently to retain its shape. A further object is to provide means for preventing the collapse of the wall of the bore with which a blank may be provided.

The invention will be hereinafter fully set forth and particularly pointed out in the claims.

In the accompanying drawings:—

Figure 2:
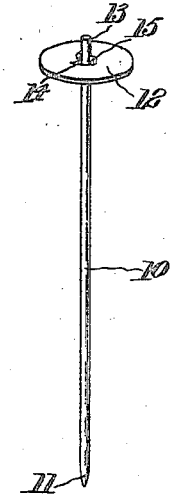
Figure 3:
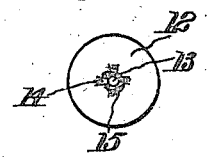
Figure 4:
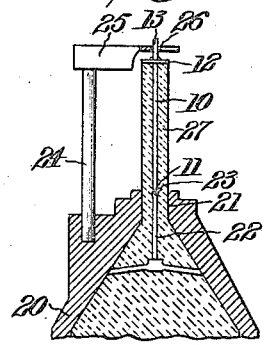

Figure 1 is a longitudinal sectional view illustrating a plastic blank with my invention applied thereto. Fig. 2 is a perspective view illustrating my improved handling device. Fig. 3 is a top plan view thereof. Fig. 4 is a detail view illustrating one method of forming the plastic blanks and applying my invention thereto.

Referring to the drawing, 10 designates a rigid core member preferably formed of wire or a small rod, tapered at its lower end 11 and passed through a circular disk 12, the upper end of the core, protruding above said disk, forming a handle 13. The disk may be secured to the core 10 in any suitable manner, the method illustrated in the drawings comprising the forming of a hole in the disk by punching out tongues 14, which tongues bear against the core member 10, relative movement being prevented by a drop of solder 15, or the like.

The blank of plastic material may be formed in any suitable manner, although I prefer to employ the apparatus illustrated and claimed in a companion case filed by Benjamin A. Jeffery. It will be understood, however, that I do not desire to be limited in this particular. Referring to Fig. 4, the plastic clay is placed within an expressing machine 20 and forced out through a die-opening 21 in the top thereof. Centrally located in said die-opening is a core-pin 22 provided with a recess 23 in its upper end. Extending upwardly from the cover of the machine 20 is a rod 24 on which is adjustably mounted a gage 25 provided with a forked seat 26, said seat being in perpendicular alinement with said core pin. In practice the core member is placed in position with its reduced end seated in the recess 23 of the core pin, the handle portion 13 resting in the seat 26 of the gage 25. As the material is forced out through the die opening 21 a cylindrical blank 27 is formed, the discharged mass passing over the core member 10 and embedding the latter centrally within the blank. When a blank of the desired length is formed the same is severed in a suitable manner, after which the operator removes the blank by grasping the handle portion 13, after which a new core member is placed in position as the operation continued.

From the foregoing it will be observed that the handle 13 provides a simple and efficient means for lifting and handling the plastic blank, permitting the required handling thereof without necessitating the fingers coming in contact with the plastic material at any point. It will also be noted that the core wire acts to hold the blank to its longitudinal alinement and prevents distortion thereof, the disk 12 serving the double function of a stop coöperating with the gage 25 in the formation of the blank, and a protecting means for the end of the blank to prevent the fingers of the operator from coming in contact with the plastic material while grasping the handle 13. After the blank with the embedded core member therein has dried sufficiently to withstand future handling without injury the core member 10 is withdrawn therefrom by any suitable means, such as a pair of pliers.

Having thus explained the nature of my invention and described an operative manner of constructing and using the same, although without attempting to set forth all of the forms in which it may be made, or all of the forms of its use, what I claim is:—

1. A device for handling blanks of ceramic material while in a plastic condition comprising a removable core member adapted to be embedded within the plastic material and provided with means for protecting one end of the blank.

2. A device for handling blanks of ceramic material while in a plastic condition comprising a removable core member adapted to be embedded within the plastic material and provided with a handle portion and means contiguous to said handle portion for protecting one end of the blank.

3. A device for handling blanks of ceramic material while in a plastic condition comprising a removable core member adapted to be embedded within the plastic material, said core member being provided with a transversely arranged disk.

In testimony whereof I have hereunto set my hand in presence of two subscribing witnesses.

JOSEPH A. JEFFERY.

Witnesses:
MORTIMER C. DEWITT,
R. W. GREEN.

Copies of this patent may be obtained for five cents each, by addressing the "Commissioner of Patents, Washington, D. C."